Patented Sept. 25, 1945

2,385,365

UNITED STATES PATENT OFFICE 2,385,365

SALICYLIC ACID COMPOUNDS FOR SAFER THERAPEUTIC USE

Karl Paul Link, Madison, Wis., assignor to Wisconsin Alumni Research Foundation, Madison, Wis., a corporation of Wisconsin No Drawing. Application February 17, 1943, Serial No. 476,211

8 Claims. (Cl. 167—65)

My invention relates to the reduction of danger in the therapeutic use of salicylic acid compounds.

Salicylic acid compounds stands high as beneficial drugs, and are among the most widely used of all drugs. Among them is the familiar acetylsalicylic acid, commonly known as "Aspirin."

In spite of the many benefits from salicylic acid compounds, danger is involved in their use, including the danger of hemorrhage. While this danger of hemorrhage has not been generally recognized, either by the medical profession or by the public, there has been sporadic knowledge of it for over half a century. Binz was probably the first to call attention to it, about 1891–1893. (Vorlesungen über Pharmakologie, 2nd edition, Berlin (1891); Berl. klin. Woch., vol. 30, p. 985, 1893; Lectures on Pharmacology, vol. II, translation of aforesaid 2nd German edition, London, 1897, pp. 269–273.) The authoritative monograph by Hanzlik on "Actions and Uses of the Salicylates and Cinchophen in Medicine" clearly recognized in 1927 the existence of danger in the use of salicylates. Sir Arthur Hurst wrote in 1939 of the power of aspirin to produce severe gastric hemorrhage. (Guy's Hosp. Rep., vol. 89, p. 173, 1939.) In 1940, the London Lancet had an article on aspirin as a poison. (Vol. 1, p. 1091, June 15, 1940.) In the same year, the Journal of the American Medical Association had an article on acetylsalicylic acid deaths. (Vol. 115, p. 1199, 1940.) Others have also recognized this danger.

Although there has thus been knowledge of danger in the use of salicylic acid compounds, including the danger of hemorrhage, the beneficial effects of salicylic acid compounds have been considered so important that the great mass of the public and probably the majority of the medical profession have been unaware of it, or if they knew of it have ignored it; although it is very real.

Moreover, even those who recognized that there was danger, and indeed even those who recognized that there was danger of hemorrhage, were apparently wholly ignorant of any reason for the hemorrhage, and for the deaths that sometimes resulted therefrom. So far as I have been able to ascertain, no one has heretofore given an explanation of the hemorrhage-inducing effects, or made any suggestion how to avoid them in the administration of salicylic acid compounds.

I have now discovered that the mechanism of such hemorrhages, and of such deaths, has involved the production of hypoprothrombinemia—a lowering of the prothrombin level (or inactivation of the prothrombin) in the blood, as measured by the prothrombin time. Such a hypoprothrombinemia—producible by salicylic acid compounds, although that was not heretofore known—may have many undesirable and even dangerous effects, including both excessive bleeding from relatively insignificant injuries, and spontaneous internal hemorrhage in various parts of the body; if long continued may produce vascular changes which promote that excessive bleeding and especially that internal hemorrhage; and may sometimes result in death.

The extent of the hypoprothrombinemia produced by a given administration of a salicylic acid compound varies with different people, and probably at different times with the same people; probably depending on what available reserve of prothrombin a person may have, as well as other factors not known at present.

This fact that salicylic acid compounds may produce hypoprothrombinemia was first established by my experiments on rats, and then on other lower animals; and it has now been established by clinical experience that it also occurs in man.

But I have also found that this tendency of salicylic acid compounds to produce hypoprothrombinemia may be effectively counteracted, and usually effectively prevented, by the administration of vitamin K compounds concurrently or substantially concurrently with the administration of such salicylic acid compounds.

In this application the claims include the following combinations of salicylic acid compounds and vitamin K compounds:

a. Both relatively water-soluble.
b. Both relatively water-insoluble.
c. The salicylic acid compound relatively water-insoluble and the vitamin K compound relatively water-soluble.

By vitamin K compounds, I mean not only natural vitamin K, such as $K_1$ or $K_2$, but also the various related compounds which tend to promote the formation or activation of prothrombin. There are many such substances, both natural and synthetic. One of the most effective yet known, and available commercially, is 2-methyl-1,4-naphthoquinone; which is about three times as effective as natural vitamin $K_1$, and for which the Council of Pharmacy and Chemistry of the American Medical Association has recognized the name of "Menadione."

Among such vitamin K compounds, in addition to vitamin $K_1$ and vitamin $K_2$ and Menadione, all of which are relatively water-insoluble, are the following:

2-methyl-1,4-naphthohydroquinone,
2-methyl-1,4-naphthohydroquinone diacetate,
2 - methyl - 3 - hydroxy - 1,4 - naphthoquinone ("Phthiocol"),
4-amino - 2 - methyl - 1 - naphtholhydrochloride ("Synkamin"),
2 - methyl - 1,4 - naphthohydroquinone - 3 - sodiumsulfonate ("Hykinone"), 2-methyl-1,4-naphthohydroquinone-diphosphoric acid ester tetrasodium salt ("Synkayvite"), 2-methyl-1,4-dihydroxy-3-naphtholaldehyde.

In the list just given, the first three are relatively water-insoluble, and the remainder are relatively water-soluble.

By administration of vitamin K compounds along with salicylic acid compounds, it is possible to eliminate the danger of hypoprothrombinemia, and yet to retain the beneficial effects of the salicylic acid compounds.

By salicylic acid compounds I mean the following therapeutically used compounds:

1. Salicylic acid itself.
2. Salicylic acid with substituents for the hydrogen of the carboxyl group, including
    a. Salts of salicylic acid, such as
        I. Sodium salicylate,
        II. Ammonium salicylate,
        III. Calcium salicylate.
    b. Esters of salicylic acid, such as
        I. Methyl salicylate (oil of wintergreen),
        II. Ethyl salicylate ("Sal-Ethyl"),
        III. Phenyl salicylate ("Salol"),
        IV. α-Naphthyl salicylate,
        V. β-Naphthyl salicylate,
        VI. Acetyl-p-aminophenyl salicylate ("Salophen"),
        VII. Salicylic acid ester of monoglycol ("Spirosal"),
        VIII. Methoxymethyl salicylate ("Mesotan").
3. Salicylic acid with acyl substituents for the hydrogen of the phenolic hydroxyl group, such as
    a. Acetylsalicylic acid (Aspirin),
    b. Methylene-citrylsalicylic acid ("Novaspirin"),
    c. Salicyclic acid ester of salicyclic acid ("Salysal"),
    d. Succinic acid ester of salicylic acid ("Diaspirin").
4. Salicylic acid with substituents for the hydrogen of the carboxyl group and substituents for the hydrogen of the phenolic hydroxyl group, such as
    a. Salts of the compounds of group 3,
    b. Esters of the compounds of group 3, Ethyl carbonate").
5. Salicylamide.
6. Salicin.
7. Salicylic alcohol.

Of the foregoing, class 1 is relatively water-insoluble; in class 2, the salts listed under sub-class $a$ are relatively water-soluble, and the esters listed under sub-class $b$ are relatively water-insoluble; in class 3, the acyl-substituted salicylic acids listed are relatively water-insoluble; in class 4, the compounds listed are in general relatively water-insoluble, although sometimes less so than the parent substances of class 3; and classes 5, 6, and 7 are relatively water-soluble.

The dosages used of these various salicylic acid compounds vary over a wide range. With aspirin, for instance, the dosage is often as small as one 5-grain tablet, or even less, as the total medication; and has been known to be as large as 100 grains or more in a day, and to be continued for days. The single 5-grain dose is ordinarily not in itself sufficient to produce in a normal adult any dangerous or even detectable hypoprothrombinemia. (The determination of prothrombin time is desirably made with dilute plasma, by the method described in the paper by Campbell, Smith, Roberts, and Link published in the Journal of Biological Chemistry, Vol. 138, March, 1941, page 1.) But large doses may reducce the prothrombin level (or activity) to a hazardous extent; and repeated doses (the so-called "divided doses") have a dangerous cumulative effect in the tendency to reduce the prothrombin level (or activity), and even if they are not also individually large doses may reduce it so greatly that serious consequences and even death may ensue. Moreover, some salicylic acid compounds are given parenterally, such as the well-known intravenous injections of sodium salicylate for arthritic and other conditions. The effect on the prothrombin level (or activity) is always a delayed effect; and is a cumulative effect on repeated doses, superposing one peak on another until disaster may occur. In addition, a long-continued hypoprothrombinemia may induce dangerous vascular changes, and probably other undesirable organic effects.

Any of the vitamin K compounds may be administered concurrently with any of the salicylic acid compounds, and serve effectively to counteract the tendency of such salicylic acid compounds to lower the prothrombin level (or activity). The amount of vitamin K compound may be quite small to produce this effect; although the minimum effective dose has not yet been determined, just as the medical profession has not yet finally determined the minimum effective dose of vitamin K compounds generally.

The following experience with rats indicates the general dosage situation:

In 250 gram rats maintained on a diet low in vitamin K but otherwise adequate, it is found that ample protection against hypoprothrombinemia otherwise producible by single 50 mg. oral doses, and single 100 mg. oral doses, of aspirin have been obtained with doses of 10.0 mg., or 1.0 mg., or 0.1 mg., or 0.05 mg., or 0.01 mg., of Menadione; and 10.0 mg. of Menadione gave no greater protection than did 0.05 mg.

New and Non-Official Remedies (1942, p. 584) suggests 2 mg. as the maximum daily dose of Menadione. Quick says that the dose of Menadione need never exceed 10 mg. per day, and that in no instance has such an amount shown any toxicity. (Quick, "The Hemorrhagic Diseases," p. 242; published by Charles C. Thomas, Baltimore, 1942.) Butt and Snell say that doses of vitamin K compounds as high as 68 mg. per day have been tolerated by man without any toxic effect. (Butt and Snell's Monograph on "Vitamin K," page 20; published by The Saunders Co., Philadelphia, 1941.)

Very small amounts of vitamin K compounds usually give protection against hypoprothrombinemia from salicylic acid compounds, but larger amounts give surer protection.

If the salicylic acid compound is not salicylic acid itself, it may be reduced to equivalent parts of salicylic acid, as by a table such as that shown on page 30 of New and Non-Official Remedies for 1942.

Similarly, if the vitamin K compound is not one of the natural vitamins $K_1$ and $K_2$, but is one of the various synthetic vitamin K compounds, such as 2-methyl-1,4-naphthoquinone (Menadione) or other vitamin K analog, it may be reduced to equivalent parts of vitamin K, as by a table such as that appearing on page 11 of the monograph on vitamin K by H. R. Butt and A. M. Snell (The Saunders Co., Philadelphia, 1941).

While it is of course possible to administer the salicylic acid compound and the vitamin K compound separately, it is more convenient, and ultimately more safe because it ensures protection, if the vitamin K compound is incorporated in the same powder or pill or capsule or tablet or solution or ampoule which contains the salicylic acid compound. By so putting the two together, it is made certain that when the salicylic acid compound is administered there will be simultaneously administered the antidote which prevents the lowering of the prothrombin level (or activity).

It is known that under some abnormal conditions vitamin K compounds require the co-administration of bile salts in order to be effective in raising the prothrombin level (or activity). Among such abnormal conditions are obstructive jaundice, biliary fistula, and damaged liver.

When such abnormal conditions exist, or are suspected to exist, what I have discovered indicates that the administration of salicylic acid compounds alone is especially dangerous; for it tends to depress a prothrombin level (or activity) which may already be unduly low.

But if the administration of salicylic acid compounds is otherwise indicated—is desired for salicylic acid therapeusis—in most cases such administration can be made safer by my invention even if those abnormal conditions exist. In that case, however, in addition to administering a vitamin K compound with the salicylic acid compound, bile salts also are concurrently administered—desirably in the same powder or pill or capsule or tablet or solution or ampoule. The amount of bile salts should be that needed to get the most satisfactory effect from the administration of the vitamin K compound, and varies with different conditions and different people.

The following are examples of preparations which may be used effectively, to get the benefits of salicylic acid medication without danger of lowering the prothrombin level (or activity).

Example 1

Salicylic acid _____ grains__ 5 (325 mg.)
Vitamin $K_1$ _____ mg__ 0.2 to 2.0

Example 2

Sodium salicylate solution__ 15½ grains (1.0 g.) in 5 cc. of water
2-methyl - 1,4 - naphthohydroquinone - diphosphoric acid ester tetra-sodium salt _____ 2 to 20 mg. in that same 5 cc. of water

Example 3

Acetylsalicylic acid (commonly known as "Aspirin") _____ grains__ 5
Menadione _____ mg__ 0.1 to 1.0

Example 4

Acetylsalicylic acid _____ grain__ 1
Menadione _____ mg__ 0.2 to 0.5

Example 5

Acetylsalicylic acid _____ grains__ 10
Vitamin $K_1$ _____ mg__ 2 to 10

Example 6

Acetylsalicylic acid _____ grains__ 5
2-methyl - 1,4 - naphthohydroquinone diacetate _____ mg__ 0.2 to 2.5

Example 7

Acetylsalicylic acid _____ grain__ 1
2-methyl - 1,4 - naphthohydroquinone diacetate _____ mg__ 0.3 to 1.0

Example 8

Acetylsalicylic acid _____ grains__ 5
2-methyl-1,4-naphthohydroquinone _____ mg__ 0.2 to 2.0

Example 9

Sal-ethyl carbonate _____ grains__ 5
Menadione _____ mg__ 0.1 to 1.0

Example 10

Methyl salicylate (oil of wintergreen) minims__ 10
4-amino-2 - methyl-1-naphthol hydrochloride _____ mg__ 1.5 to 5.0

Example 11

Phenyl salicylate _____ grains__ 5
Menadione _____ mg__ 0.4 to 1.0

Example 12

Acetylsalicylic acid _____ grains__ 5
Menadione _____ mg__ 0.5 to 1.0
Bile salts _____ grains__ 10

Example 13

Calcium salicylate _____ grains__ 15
Menadione _____ mg__ 0.5 to 1.0
Bile salts _____ grains__ 5

These examples serve to illustrate, and not to limit, the variations of which my invention is capable; and so do the ranges given in the examples. The fundamental point of all of them is the inclusion of a small amount of vitamin K compound with a relatively large amount of a salicylic acid compound, to reduce the danger of hypoprothrombinemia by reason of the administration of the salicylic acid compound.

It has been proposed to use a large excess of a highly water-soluble salicylate, such as sodium or potassium or ammonium salicylate, to put the water-insoluble Menadione (2-methyl-1,4-naphthoquinone) into water solution. That was done wholly for the purpose of obtaining water solubility of the water-insoluble Menadione. It did not involve any putting together of a salicylic acid compound and a vitamin K compound save when the former was highly water-soluble and the latter very water-insoluble; and even that was done for a wholly different purpose from that of the present invention.

I claim as my invention:

1. An antihypoprothrombinemia salicylic acid preparation, comprising a relatively water-insoluble salicylic acid compound and a vitamin K compound together.

2. An antihypoprothrombinemia acetylsalicylic acid preparation, comprising acetylsalicylic acid and a vitamin K compound together.

3. An antihypoprothrombinemia sodium salicylate preparation, comprising sodium salicylate and a relatively water-soluble vitamin K compound together.

4. An antihypoprothrombinemia salicylic acid preparation, comprising a salicylic acid compound and a relatively water-soluble vitamin K compound together.

5. An antihypoprothrombinemia salicylic acid preparation, comprising a salicylic acid compound, and a vitamin K compound, said salicylic acid compound being relatively water-insoluble when the vitamin K compound is relatively water-insoluble.

6. An antihypoprothrombinemia salicylic acid preparation, comprising a relatively water-insoluble salicylic acid compound and a relatively water-insoluble vitamin K compound together.

7. An antihypoprothrombinemia salicylic acid preparation, comprising a relatively water-soluble salicylic acid compound and a relatively water-soluble vitamin K compound together.

8. An antihypoprothrombinemia salicylic acid preparation, comprising a relatively water-insoluble salicylic acid compound and a relatively water-soluble vitamin K compound together.

KARL PAUL LINK.